United States Patent
Lee et al.

(10) Patent No.: US 8,977,663 B2
(45) Date of Patent: Mar. 10, 2015

(54) CONVERTING BINARY VALUES INTO BINARY-CODED-CENTIMAL VALUES

(75) Inventors: Austin A. T. Lee, Menlo Park, CA (US); Josephus C. Ebergen, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 434 days.

(21) Appl. No.: 13/419,328

(22) Filed: Mar. 13, 2012

(65) Prior Publication Data

US 2013/0246490 A1    Sep. 19, 2013

(51) Int. Cl.
    *G06F 7/00*    (2006.01)
(52) U.S. Cl.
    USPC .......................................................... 708/204
(58) Field of Classification Search
    None
    See application file for complete search history.

(56) References Cited

U.S. PATENT DOCUMENTS 4,638,300 A *  1/1987  Miller ............................ 341/84
6,546,411 B1 *  4/2003  Singh ........................... 708/710

OTHER PUBLICATIONS

Aberth, Oliver; Precise Scientific Computation with a Microprocessor; Aug. 1984; IEEE Transactions on Computers, vol. c-33 No. 8 pp. 685-690.*

* cited by examiner

*Primary Examiner* — Michael D Yaary
(74) *Attorney, Agent, or Firm* — Park, Vaughan, Fleming & Dowler LLP; Mark D. Spiller

(57) ABSTRACT

The disclosed embodiments facilitate converting binary values into the BCC format. One technique facilitates the direct conversion of binary numbers into BCC. A second variation first converts a binary number into an intermediate BCD value, and then converts that BCD value into a BCC value. Look-ahead comparators can further improve conversion performance by decreasing the latency of the conversion operation. By speeding up the conversion of binary values to decimal-format values, the disclosed techniques facilitate leveraging dedicated binary-format hardware for decimal-format operations, and thus improve the performance of decimal-format operations.

18 Claims, 18 Drawing Sheets

DECIMAL
DIGIT COLUMNS
100

| OPERATION | HUNDREDS | TENS | UNITS | BINARY INPUT | |
|---|---|---|---|---|---|
| HEX | | | | F | F |
| START | | | | 1 1 1 1 | 1 1 1 1 |
| SHIFT 1 | | | 1 ⇐ | 1 1 1 1 | 1 1 1 |
| SHIFT 2 | | | 1 1 ⇐ | 1 1 1 1 | 1 1 |
| SHIFT 3 | | | 1 1 1 ⇐ | 1 1 1 1 | 1 |
| ADD 3 | | | 1 0 1 0 | 1 1 1 1 | 1 |
| SHIFT 4 | | 1 | 0 1 0 1 ⇐ | 1 1 1 1 | |
| ADD 3 | | 1 | 1 0 0 0 | 1 1 1 1 | |
| SHIFT 5 | | 1 1 | 0 0 0 1 ⇐ | 1 1 1 | |
| SHIFT 6 | | 1 1 0 | 0 0 1 1 ⇐ | 1 1 | |
| ADD 3 | | 1 0 0 1 | 0 0 1 1 | 1 1 | |
| SHIFT 7 | 1 | 0 0 1 0 | 0 1 1 1 ⇐ | 1 | |
| ADD 3 | 1 | 0 0 1 0 | 1 0 1 0 | 1 | |
| SHIFT 8 | 1 0 | 0 1 0 1 | 0 1 0 1 ⇐ | | |
| BCD | 2 | 5 | 5 | | |

FIG. 1

| INPUT | | | | OUTPUT | | | |
|---|---|---|---|---|---|---|---|
| A3 | A2 | A1 | A0 | S3 | S2 | S1 | S0 |
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 0 | 0 | 1 | 1 |
| 0 | 1 | 0 | 0 | 0 | 1 | 0 | 0 |
| 0 | 1 | 0 | 1 | 1 | 0 | 0 | 0 |
| 0 | 1 | 1 | 0 | 1 | 0 | 0 | 1 |
| 0 | 1 | 1 | 1 | 1 | 0 | 1 | 0 |
| 1 | 0 | 0 | 0 | 1 | 0 | 1 | 1 |
| 1 | 0 | 0 | 1 | 1 | 1 | 0 | 0 |
| 1 | 0 | 1 | 0 | 1 | 1 | 1 | 0 |
| 1 | 0 | 1 | 1 | X | X | X | X |
| 1 | 1 | 0 | 0 | X | X | X | X |
| 1 | 1 | 0 | 1 | X | X | X | X |
| 1 | 1 | 1 | 0 | X | X | X | X |
| 1 | 1 | 1 | 1 | X | X | X | X |

CONVERTING BINARY VALUES INTO BINARY-CODED-CENTIMAL VALUES

BACKGROUND

1. Field of the Invention

This disclosure generally relates to techniques for converting between numerical representations on a computer system. More specifically, this disclosure relates to techniques for converting binary values into binary-coded-centimal values.

2. Related Art

Computers can store numbers in a range of different encodings. For instance, while a binary (or base-2) numeral system is used internally by many modern computers, alternative formats may also provide some advantages. For example, a binary-coded decimal (BCD) format uses binary sequences to represent decimal digits (e.g., using four bits to represent the decimals 0-9). Benefits of the BCD format include easy conversion to a human-readable format and the ability to store decimal quantities precisely. More specifically, in some instances decimal-based formats can express some decimal quantities more precisely than binary or floating-point binary formats, and hence continue to be favored for some financial and industrial environments.

Because decimal operations are relatively uncommon, processors often perform decimal operations in software instead of in specialized hardware. However, because performing such operations in software is typically much slower than native binary computational operations, some systems improve the performance of decimal operations by first converting decimal values to binary values, using binary computational circuits to perform operations on the binary values, and then converting the results back into decimal values. Such conversions have the potential to speed up decimal computational operation, but can result in substantial conversion overhead.

Hence, what is needed are techniques for converting between binary and decimal encodings without the above-described problems.

SUMMARY

The disclosed embodiments provide techniques for converting a binary value to a binary-coded-centimal (BCC) value.

In some embodiments, the system directly converts a binary value to a BCC value. During operation, the system iteratively shifts bits of the binary value into an intermediate value. After each shift, the system analyzes an eight-bit portion of the intermediate value to determine whether that eight-bit portion is greater than 49, and if so, adds 78 to the eight-bit portion. After all of the bits of the binary value have been shifted into the intermediate value, the system has successfully converted the binary value into a BCC value. Note that this BCC value encodes in eight bits of data two decimal digits that can range in value from zero to 99.

In some embodiments, the system first converts a binary value into a BCD value, and then converts the BCD value into a BCC value. During operation, the system iteratively shifts bits of the binary value into an intermediate value. After each shift, the system analyzes a four-bit portion of the intermediate value to determine whether the four-bit portion is greater than four, and if so, adds three to that four-bit portion. After all of the bits of the binary value have been shifted into the intermediate value, the system has successfully converted the binary value into a BCD value that encodes each decimal digit in four bits. The system then converts this BCD value into a BCC value.

In some embodiments the system simultaneously analyzes multiple portions of the intermediate value after each shift, and adds the specified value (e.g., three for a four-bit conditional adder, and 78 for an eight-bit conditional adder) to each portion that exceeds the specified limit (e.g., four for a four-bit conditional adder, and 49 for an eight-bit conditional adder).

In some embodiments, the shift operation is performed by a shift register that iteratively shifts bits of the binary value into the intermediate value. In alternative embodiments, one or more shift operations are instead performed using a combinational circuit that is comprised of multiple conditional adders. In some embodiments, this combinational circuit can include pipeline registers that facilitate pipelining the binary-to-BCC conversion operation.

In some embodiments, a conditional adder includes a comparator, an adder, and a multiplexer. The comparator determines whether a binary input value exceeds the specified limit (e.g., four or 49 for a four- or eight-bit conditional adder, respectively). The adder adds the specified value (e.g., three or 78, respectively) to the input. The multiplexer outputs either the input value or the output of the adder based on the output of the comparator.

In some embodiments, one or more conditional adders include look-ahead capabilities that facilitate reducing the latency of converting the binary value to the BCC value. A conditional adder that supports look-ahead capabilities receives input from a comparator in an earlier stage of the conversion that indicates whether the binary input value will exceed the specified limit (e.g., four or 49, respectively). Using the input from a comparator in an earlier stage facilitates removing the comparison latency from the critical path of the conditional adder.

In some embodiments, the system converts a BCC value to a binary value to leverage binary computation performance for decimal format operations. For instance, the system may: (1) convert an initial BCC value to an initial binary value; (2) perform binary computations using the initial binary value to derive a modified binary value; and (3) convert the modified binary value back to a BCC value.

In some embodiments, converting a BCD value to a BCC value involves: (1) using a first four-bit portion of an intermediate value as a high-order decimal digit; (2) using a second four-bit portion of an intermediate value as a low-order decimal digit; and (3) multiplying the first four-bit portion by ten and then adding the result to the second four-bit portion to form an eight-bit BCC value.

BRIEF DESCRIPTION OF THE FIGURES

FIG. 1 illustrates the concept of the double-dabble conversion technique in accordance with an embodiment.

DETAILED DESCRIPTION

Figures 2A, 2B:
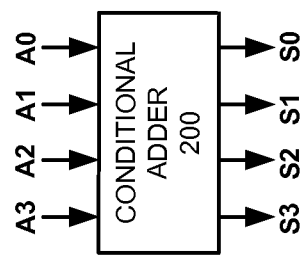
FIG. 2A illustrates a conditional 4-bit adder that facilitates converting binary values to BCD format in accordance with an embodiment.
FIG. 2B illustrates the truth table for the conditional 4-bit adder of FIG. 2A in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Binary-Coded-Decimal and Binary-Coded-Centimal Formats

As mentioned above, computers can store numbers in a range of different encodings. Most computers natively support a binary (or base-2) numeral system, but also support some alternative formats that provide additional advantages. For example, a binary-coded-decimal (BCD) format uses four-bit binary sequences to represent decimal digits (e.g., 0-9), and is sometimes used for its ease of conversion to human-readable formats such as ASCII. Another format, binary-coded-centimal (BCC), stores two decimal digits in a single binary byte. A binary byte can represent numbers from zero to 255, and thus can contain the range of two decimal digits from zero to 99 in BCC.

Both BCC and BCD suffer from inefficient storage density and more complex arithmetic operations than binary arithmetic. However, decimal-based formats can be converted to a human-readable format more easily, and can also express some decimal quantities more precisely than binary or floating-point binary encodings, and hence continue to be favored for some financial and industrial environments. For instance, a modified version of BCC is used to encode data in some database formats (e.g., in the Oracle Numbers (ON) format, a centimal format which also has the benefit of being easily sortable).

In the ON format, each digit in the significand is a base-100 digit, meaning that each digit represents a number in the range 0-99. Alternatively, one can treat numbers in ON format as special decimal numbers, where all decimal digits come in pairs representing a value in the range 00-99. Each pair of decimal digits can be encoded in a BCC representation. In this document, the ON format is treated as a special case of a decimal format.

Because decimal-format operations are relatively uncommon, processors often perform decimal-format operations in software, which is much slower than 32-bit or 64-bit binary computation performed natively in hardware. Additional custom hardware can be used to speed up decimal-format operations, either by providing direct hardware support for the decimal-format operations or by aiding the processor in converting decimal-format values to and from a CPU-native format. The latter approach can be especially beneficial when a series of difficult and varied operations (such as multiplication and division) need to be performed on a decimal-format value (e.g., a number in ON format); for instance, converting a decimal-format value to binary allows the system to leverage dedicated binary-format hardware (e.g., binary-format multiplication and/or division units) that can perform the operation much more quickly than software-based techniques. However, to improve overall performance, the performance improvement gained by performing the difficult operation natively needs to be greater than the additional overhead involved in performing the conversions.

Note that converting from a decimal format to a binary value and the inverse operation of converting a binary value to a decimal format have different challenges and complexity. For instance, issues can arise when converting decimal formats to binary values, because the full range of ON values cannot be contained by 32-bit and/or 64-bit binary values. For example, ON numbers may use 20+ bytes to store 38 to 40 decimal digits, while a 32-bit binary (integer) value often can only store 10 decimal places, and a 64-bit binary (integer) value can only store 20 decimal places. Floating-point representations can store a wider range of values, but with reduced precision (which can lead to potential errors in accuracy). Benchmarks demonstrate that a 32-bit floating-point encoding spans about 90% of ON values, while a 64-bit floating-point encoding spans about 94% of ON values. Note, however, that these limitations do not prevent using conversion techniques to optimize the common case; conversion techniques can still be used to speed up operations for the set of values that can be converted precisely, while alternative techniques can be used to maintain accuracy for values that cannot be converted precisely (e.g., by performing the desired operations in software instead).

While converting from a decimal format to a binary value (e.g., ON to binary, or "on2b") involves some special cases (as described above), in general converting from binary to a decimal format (e.g., binary to ON, or "b2 on") does not involve any such limitations (e.g., values represented in a native format will typically fit in an ON format). However, the b2 on conversion is typically more computationally intensive; binary-to-decimal conversion is often 2-4 times slower than decimal-to-binary conversion. Embodiments of the present invention improve the performance of converting binary values into decimal formats (specifically, into the BCC format).

Converting Binary Values to the BCD Encoding

Some existing techniques for converting binary values to the BCD format are based on the "double-dabble" technique, which involves iteratively shifting an initial binary input into an intermediate value one bit at a time, and modifying the result between each shift. When the original input has been completely displaced from its starting position, the conversion is complete.

FIG. 1 illustrates the concept of the double-dabble conversion technique. The bits of an input (in FIG. 1, input 0xFF at the top right, represented in binary as "1111 1111") are iteratively shifted into an intermediate value. A conditional add-3 operation occurs between each shift for each decimal digit column 100 of the intermediate value that is greater than four. Each shift represents a doubling of the input; hence, if the value in any decimal digit column 100 is greater than four, a doubling would cause that value to become greater than nine, which is an invalid representation in BCD encoding. To avoid this, the conversion technique processes the carry between each doubling operation to ensure that the decimal digit columns 100 are properly encoded. Adding three (to intermediate values that are greater than four) before the shift ensures that the carry to the next decimal digit is performed properly.

For instance, if the input is five, then adding three results in an eight (e.g., a binary value of "1000"), which when doubled properly represents ten in BCD encoding (e.g., a binary value of "1 0000", which in the BCD format represents a one in the tens digit and a zero in the units digit). If the intermediate decimal digit is less than five in value, then the doubling will not cause a carry to the next decimal digit; therefore, no modification is necessary. The same technique of adding three also holds for intermediate values greater than five. After the full length of the binary input has been shifted, the decimal digit columns 100 contain the converted BCD value (e.g., for the illustrated example, a hundreds digit of '2', a tens digit of '5', and a units digit of '5').

FIG. 2A illustrates a conditional 4-bit adder 200 that facilitates converting binary values to BCD format. The truth table for conditional adder 200 is illustrated in FIG. 2B. As described above, conditional adder 200 adds a value of three if its inputs (A0-A3) are greater than four; otherwise, the input value is passed through. 4-bit input values of ten or larger are beyond the range of decimal digits, and should not occur; thus, such values are associated with "don't care" (e.g., "XXXX") output values.

The double-dabble technique can be implemented in a range of hardware configurations. For example, double-dabble can be implemented for low area using a shift register or for low delay using a large combinational circuit with potential pipelining.

Figure 3A:
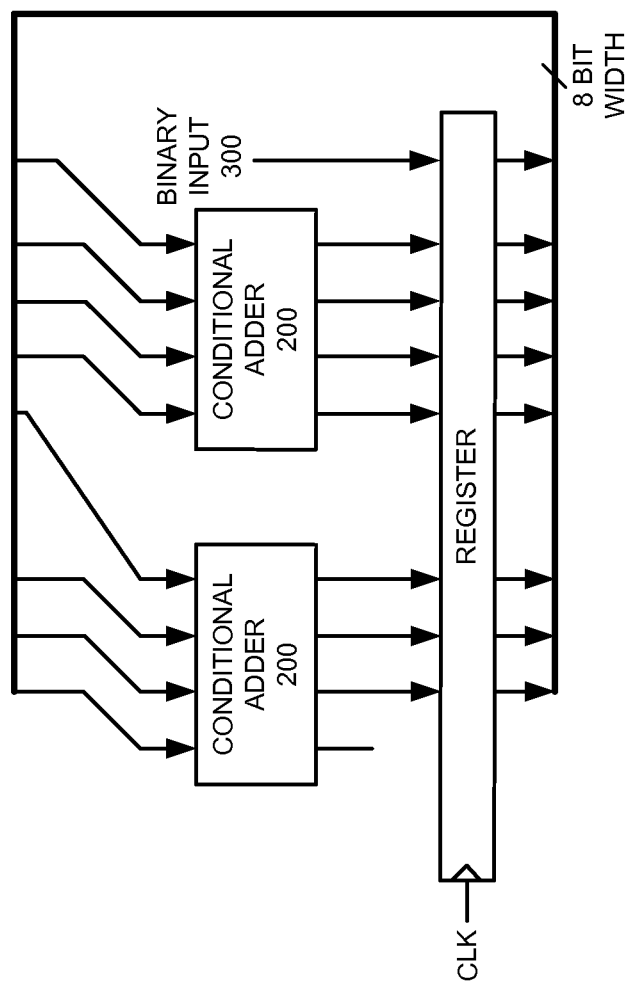
FIG. 3A illustrates a low-area shift-register implementation of an 8-bit binary-to-BCD converter in accordance with an embodiment.

FIG. 3A illustrates a low-area shift-register implementation of an 8-bit binary-to-BCD converter that performs the conversion process as described above (for FIG. 1). The register begins cleared to zero, and the binary input value 300 is shifted in iteratively, one bit at a time, with two conditional adders 200 adjusting the values for each of their decimal digits as needed after each shift. The latency for a complete conversion operation is the clock period multiplied by the number of input bits in the binary value (e.g., the conversion operation is complete after 8 clock cycles, at which point the register outputs represent the converted result). Note that this approach needs to store each binary primary input and each BCD primary output bit during the conversion process, and uses a conditional 4-bit adder for each decimal digit in the BCD output.

Figure 3B:
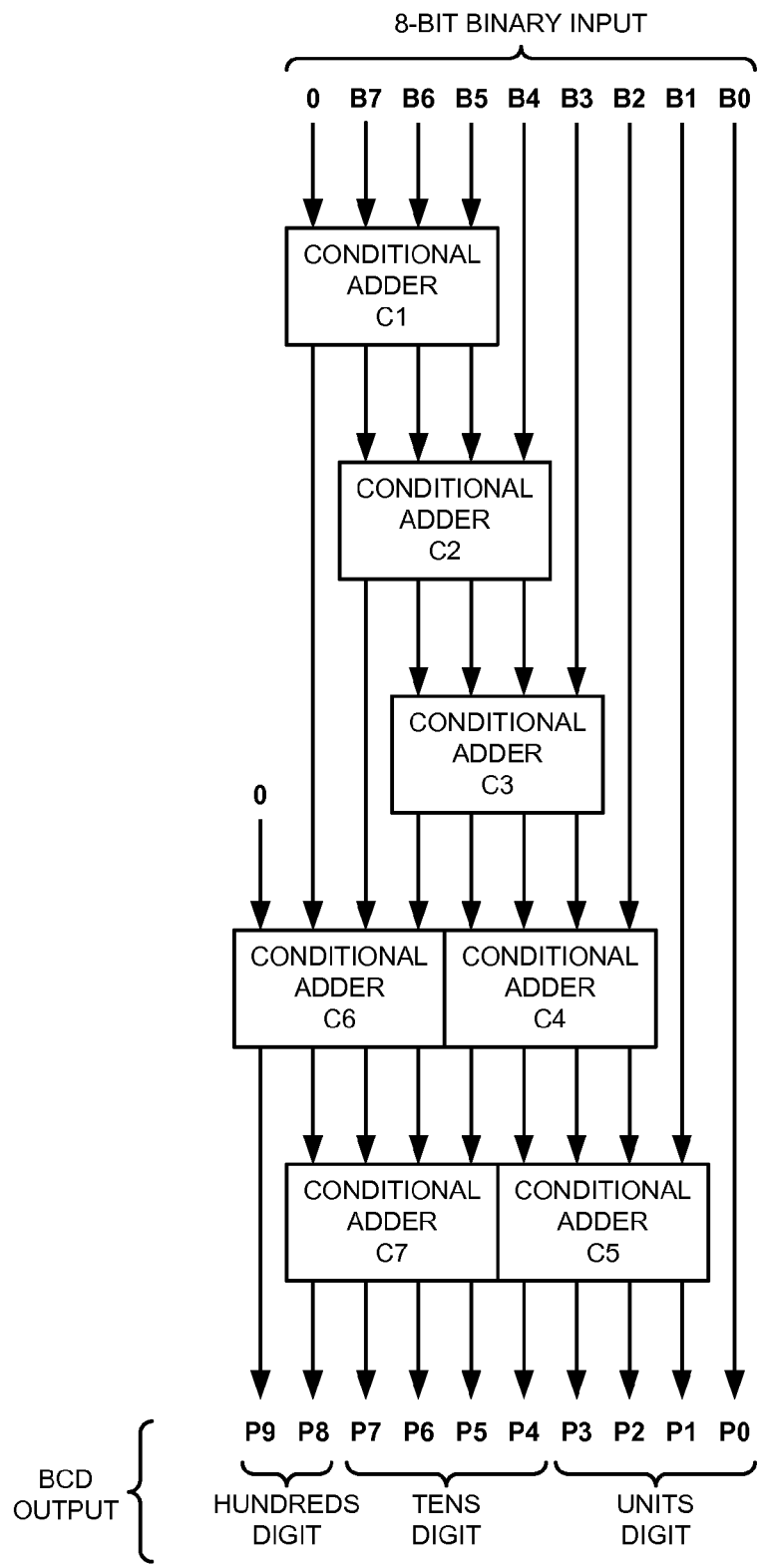
FIG. 3B illustrates a combinational binary-to-BCD converter implementation in accordance with an embodiment.

FIG. 3B illustrates a combinational binary-to-BCD converter implementation that will typically be faster than the implementation of FIG. 3A. In this implementation, wires perform the shift operation between multiple rows of conditional adder modules. The boundary between decimal places travels diagonally down and to the right. The long diagonal arrangement of conditional adders C1 through C5 generates the units decimal place, while conditional adders C6 and C7 perform the carry for the tens digit. Conditional adder modules are always omitted when there is no chance of the input being greater than four, and an implied zero is used as an input when a carry could potentially be needed. Note that this design can be easily pipelined to various depths by inserting registers between rows.

Converting Binary Values to the BCC Encoding

As described above, the BCC format encodes numbers from zero to 99 in one byte (unlike the BCD format, which encodes the numbers 0-9 in 4 bits each). Embodiments of the present invention include two techniques for converting binary values to BCC values. In one embodiment, the system converts a binary value directly to the BCC format. In an alternative embodiment, the system first uses a BCD converter to convert the binary value into a BCD value, and then converts the BCD value into a BCC value.

Figure 4A:
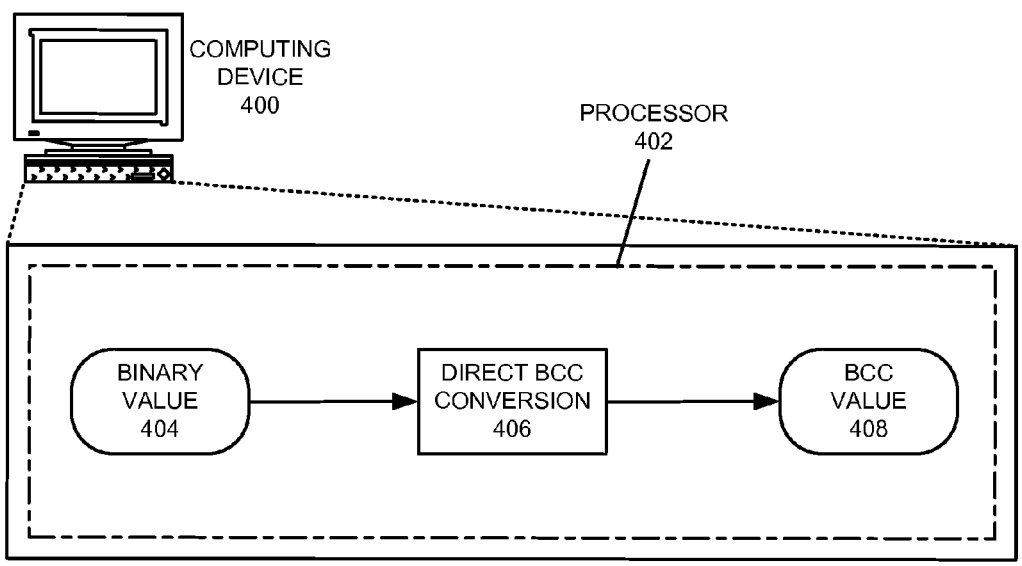
FIG. 4A illustrates a computing device that directly converts a binary value to a BCC value in accordance with an embodiment.

FIG. 4A illustrates computing device 400, which includes a processor 402 with a direct BCC conversion module 406 that directly converts a binary value 404 to a BCC value 408. In some embodiments, converting a binary value directly to the BCC format involves using an 8-bit wide conditional adder (e.g., the inputs and outputs of the conditional adder are each 8 bits wide). This conditional adder checks whether the input value is greater than 49. If so, the conditional adder adds 78 to the input; otherwise, the value remains unchanged. For example, if the input is 50, then adding 78 results in an output of 128 (represented in binary as "1000 0000"). This output, when doubled (i.e., shifted), will properly represent the value 100 in BCC format (e.g., binary "1 0000 0000"). The same technique of adding 78 also holds for all other input values larger than 50. Input values smaller than 50 need no processing, because they will still be less than 100 after doubling.

The above-described 8-bit conditional adder can be incorporated into a range of BCC conversion implementations. For instance, as described above for the BCD format, the 8-bit conditional adder can be incorporated into a low-area implementation that uses a shift register or a low-delay implementation that uses a large combinational circuit with potential pipelining.

Figure 5A:
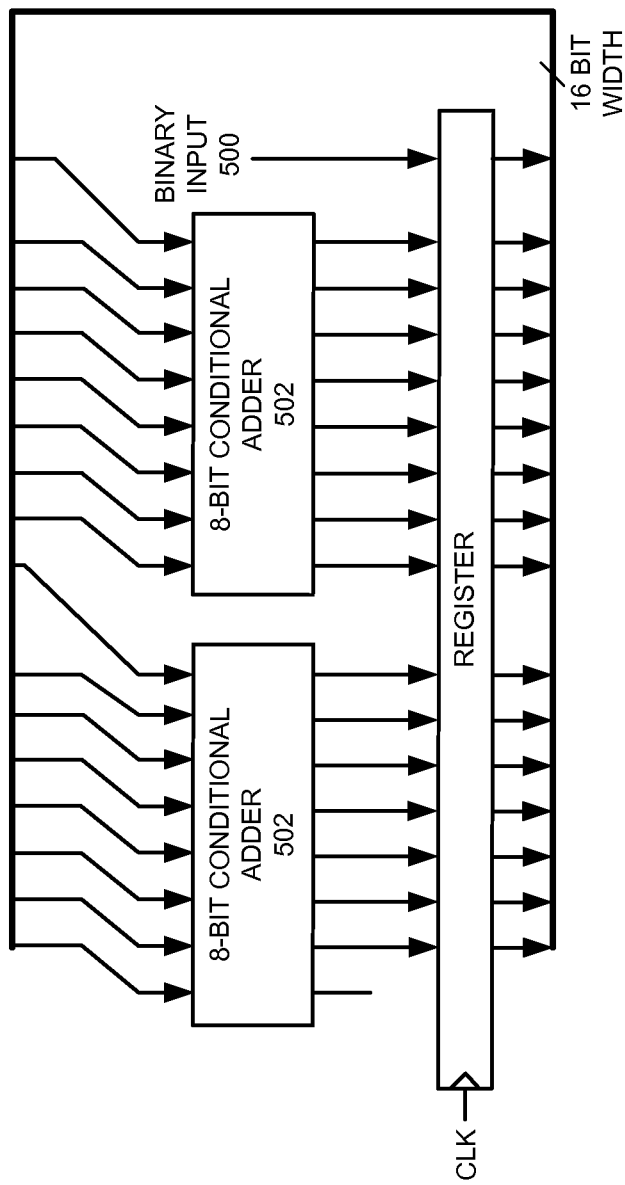
FIG. 5A illustrates a low-area shift-register implementation of a 16-bit binary-to-BCC converter in accordance with an embodiment.

FIG. 5A illustrates a low-area shift-register implementation of a 16-bit binary-to-BCC converter. The register begins cleared to zero, and the binary input value 500 is shifted in iteratively, one bit at a time, with two 8-bit conditional adders 502 adjusting the values for each of their outputs as needed after each shift. As previously described for FIG. 3A, the latency for a complete conversion operation is the clock period multiplied by the number of input bits in the binary value (e.g., the conversion operation is complete after 16 clock cycles, at which point the register outputs represent the converted result in BCC format). Note that this approach needs to store each binary primary input and each BCC primary output bit during the conversion process, and uses a conditional 8-bit adder for each unit of BCC output.

Figure 5B:
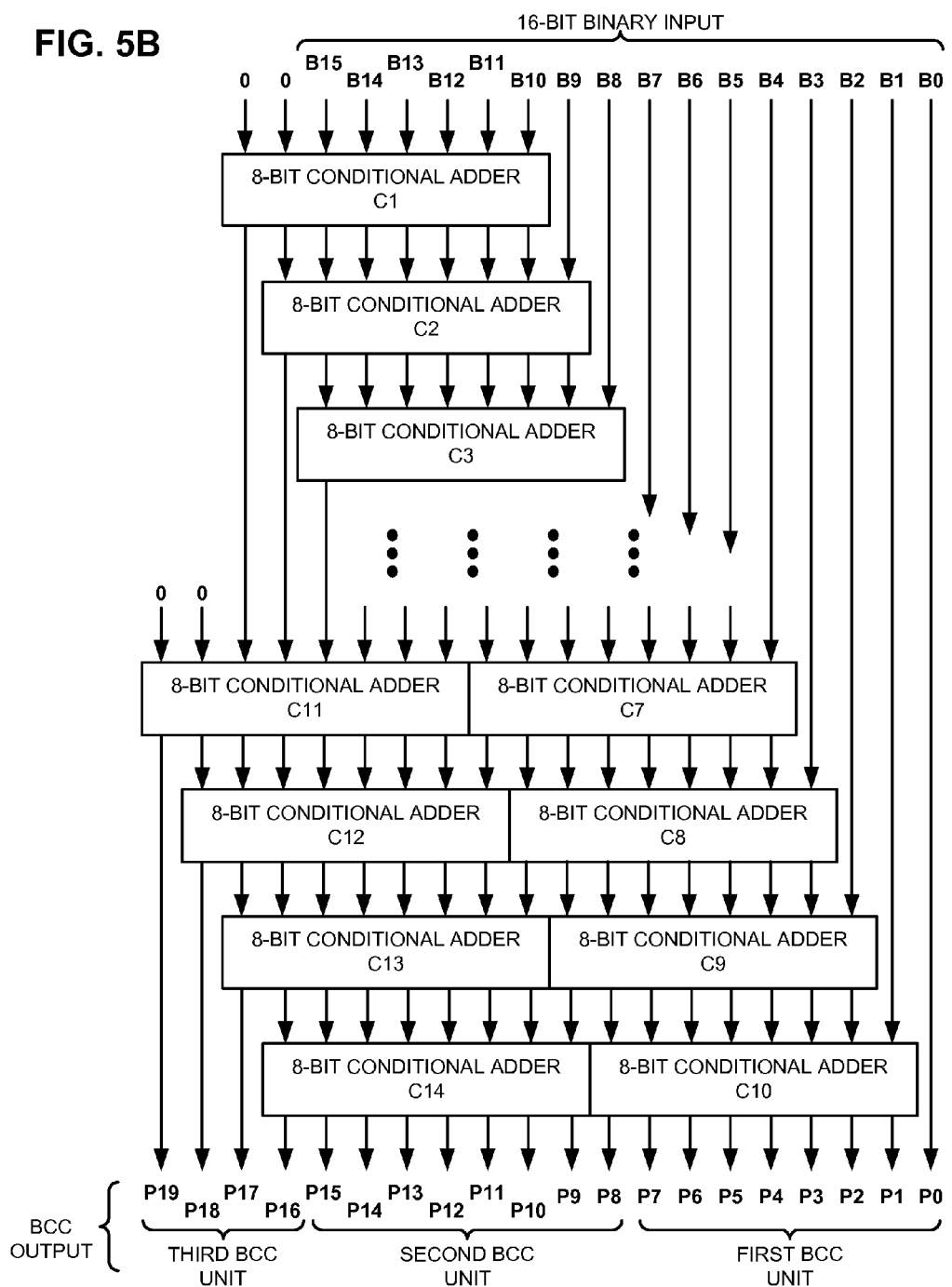
FIG. 5B illustrates a combinational binary-to-BCC converter implementation in accordance with an embodiment.

FIG. 5B illustrates a combinational binary-to-BCC converter implementation that will typically be faster than the implementation of FIG. 5A. As described for the BCD converter of FIG. 3B, wires perform the shift operation between multiple rows of (now 8-bit) conditional adder modules. The boundary between BCC units travels diagonally down and to the right. The long diagonal arrangement of conditional adders C1 through C10 generates the first BCC unit, while conditional adders C11 through C14 perform the carry for the second BCC unit. Note that some of the described adjustments needed for BCC conversion have some implications for the hardware architecture of a combinational converter design. For instance, the 8-bit conditional adder may now have an input greater than 49 when 6 out of 8 input bits are present. Therefore, using the same logic used to design the BCD conversion architecture, each new diagonal chain of conditional adder modules may need two bits of an implied zero value input on the left side (as opposed to the single implied zero input for each diagonal illustrated in FIG. 3B). Note that this design can also be easily pipelined to various depths by inserting registers between rows.

Figure 6A:
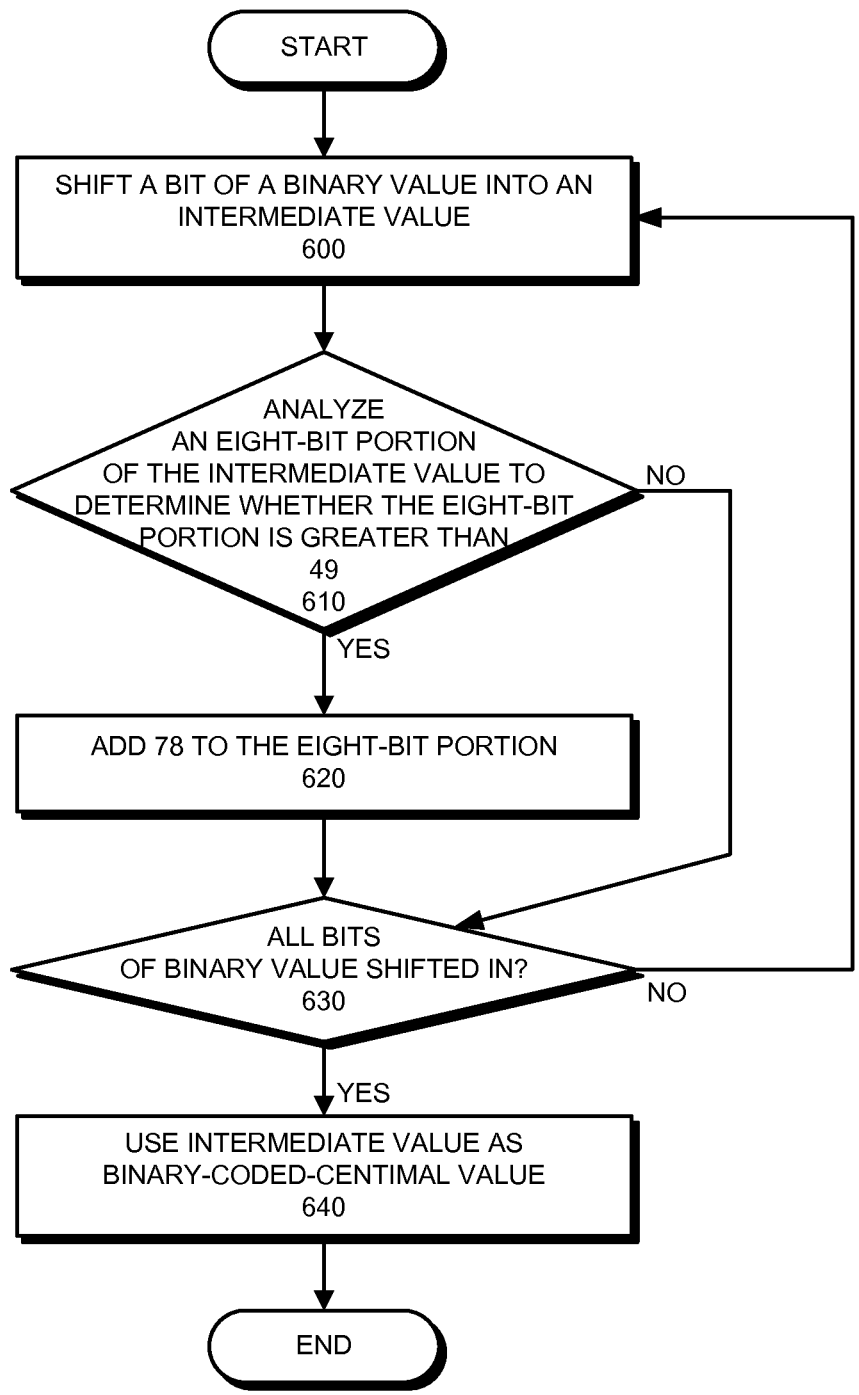
FIG. 6A presents a flow chart that illustrates the process of directly converting a binary value to a BCC value in accordance with an embodiment.

FIG. 6A presents a flow chart that illustrates the process of directly converting a binary value to a BCC value. During operation, the system iteratively shifts bits of the binary value into an intermediate value (operation 600). After each shift, the system analyzes an eight-bit portion of the intermediate value to determine whether the eight-bit portion is greater than 49 (operation 610). If so, the system adds 78 to the eight-bit portion (operation 620); otherwise, the eight-bit portion remains unchanged. The system repeats this process (operations 600-620) until all of the bits of the binary value have been shifted into the intermediate value (operation 630). After all of the bits of the binary value have been shifted into the intermediate value, it has been successfully converted into a BCC value; more specifically, the intermediate value can now be used as a BCC value (operation 640) that encodes in eight bits of data two decimal digits that can range in value from zero to 99.

In an alternative embodiment, the system first uses a BCD converter to convert a binary value into a BCD value, and then converts the BCD value into a BCC value. For instance, the system can include a full binary-to-BCD converter that is followed by one more row of BCD-to-BCC converters. The BCD-to-BCC conversion operation takes two 4-bit BCD units as input, and outputs a combined 8-bit BCC unit by multiplying the left BCD unit by 10 and adding the resulting value to the right BCD unit. Note that multiple BCD-to-BCC conversion modules can all execute independently, thus adding little overhead to large (32-bit or more) converters. One benefit of this design relative to a full BCC converter is that, although the critical path is the same length, each module is simpler, because BCD converter modules are simpler than BCC converter modules. However, this design also imposes the additional cost (e.g., in area and delay) of the final stage's BCD-to-BCC converters, which is avoided in the direct-to-BCC (also referred to as "all-BCC") design.

Figure 4B:
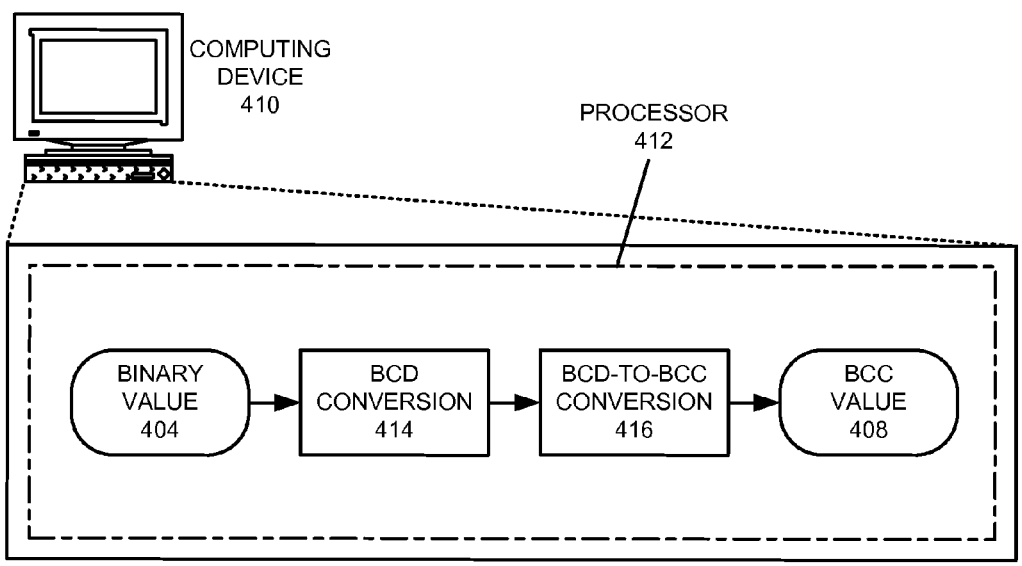
FIG. 4B illustrates a computing device that first converts a binary value to a BCD value and then converts the BCD value to a BCC value in accordance with an embodiment.

FIG. 4B illustrates computing device 410, which includes a processor 412 with a BCD conversion module 414 that first converts binary value 404 to a BCD value. After this first conversion, a BCD-to-BCC conversion module 416 converts the BCD value to BCC value 408.

Figure 6B:
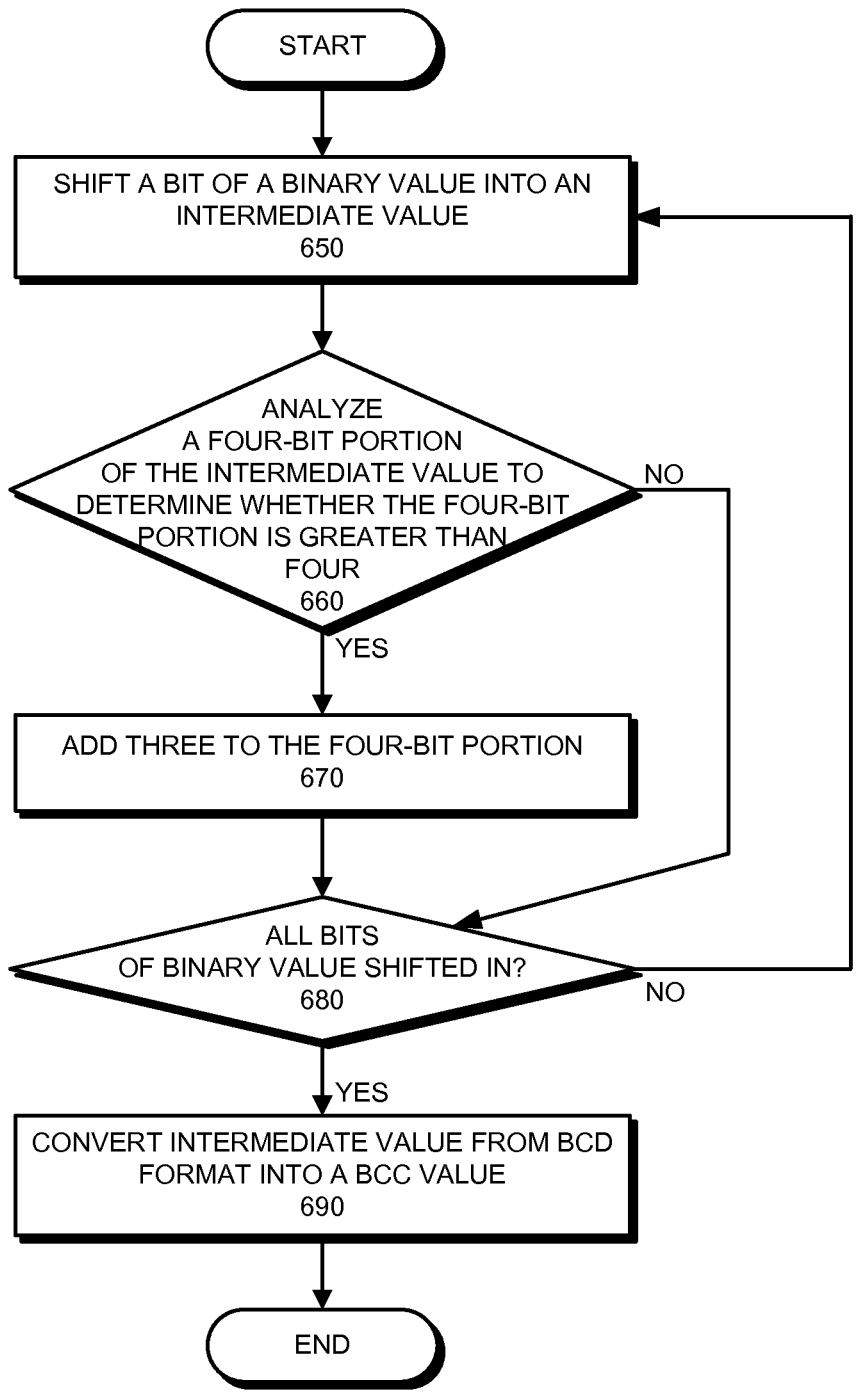
FIG. 6B presents a flow chart that illustrates the process of first converting a binary value into a BCD value and then converting the BCD value into a BCC value in accordance with an embodiment.

FIG. 6B presents a flow chart that illustrates the process of first converting a binary value into a BCD value, and then converting the BCD value into a BCC value. During operation, the system iteratively shifts bits of the binary value into an intermediate value (operation 650). After each shift, the system analyzes a four-bit portion of the intermediate value to determine whether the four-bit portion is greater than four (operation 660). If so, the system adds three to the four-bit portion (operation 670); otherwise, the four-bit portion remains unchanged. The system repeats this process (operations 650-670) until all of the bits of the binary value have been shifted into the intermediate value (operation 680). After all of the bits of the binary value have been shifted into the intermediate value, the intermediate value now stores a binary value which has been converted into BCD format (e.g., where each decimal digit has been encoded into four bits). The system then converts this intermediate (BCD) value into a BCC value (operation 690).

Figure 7:
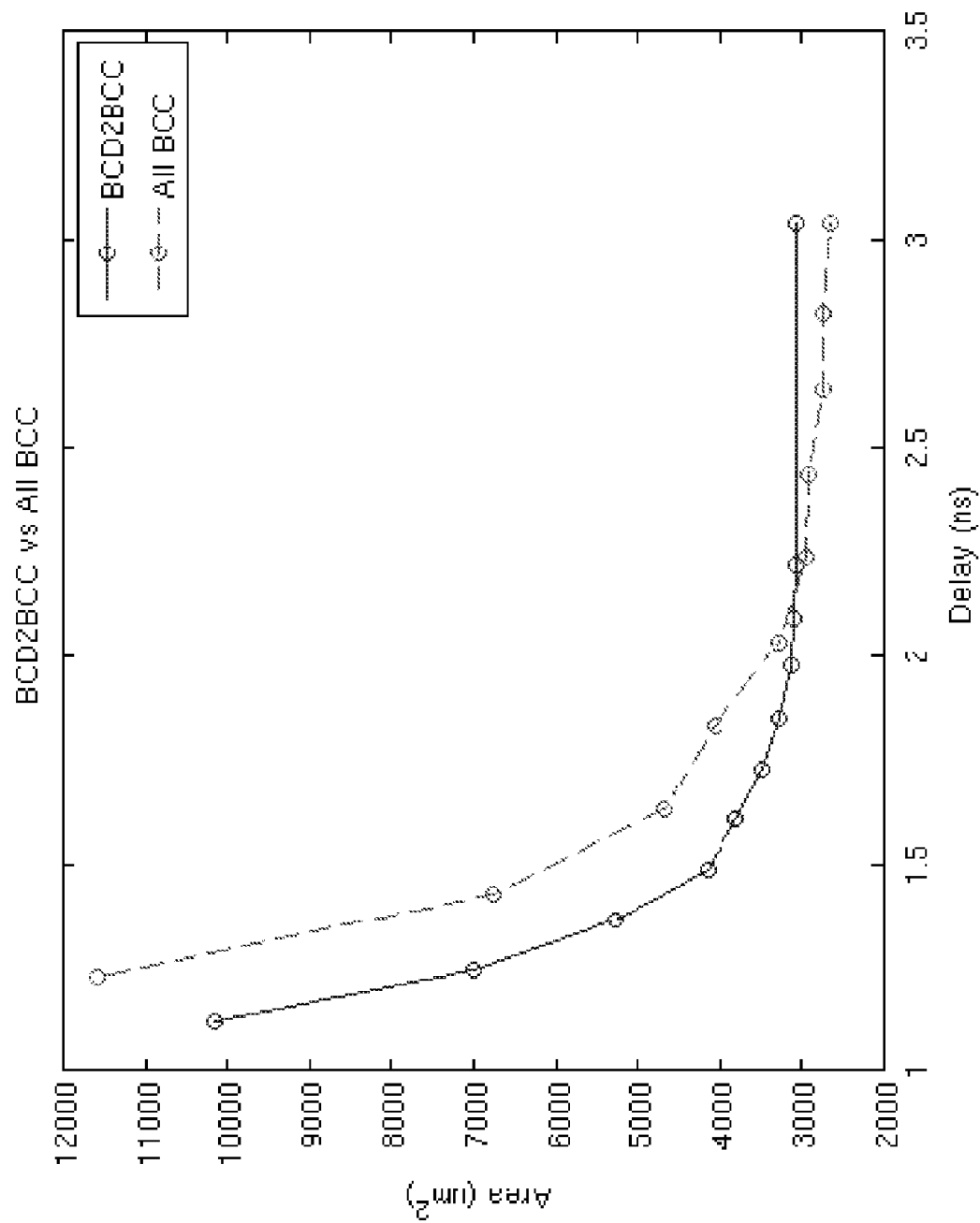
FIG. 7 illustrates a comparison of the area-delay trade-off curves for an all-BCC design and a BCD-to-BCC design in accordance with an embodiment.

FIG. 7 illustrates a comparison of the area-delay trade-off curves for the all-BCC converter design and the BCD-to-BCC converter design. In the graph illustrated in FIG. 7, each point represents the minimum achievable area for a given delay constraint. The curves provide an easy way to compare designs which may not be strictly better than their alternatives, but are useful in different circumstances. Points to the left and below other points are strictly superior, while points to the left and above or to the right and below other points represent a trade-off between design objectives. In this description, area can also be used as a first-order approximation for energy consumption.

FIG. 7 illustrates that for low-latency (i.e., low-delay) implementations, the simplicity of the BCD converters may make the BCD-to-BCC design more favorable, despite the additional BCD-to-BCC conversion hardware and delay. The all-BCC design becomes more competitive when low area is desired and/or longer delay is acceptable. Note that these (and all subsequent) simulation results are based on a 40 nm process technology.

Look-Ahead Latency Improvements

Figure 8B:
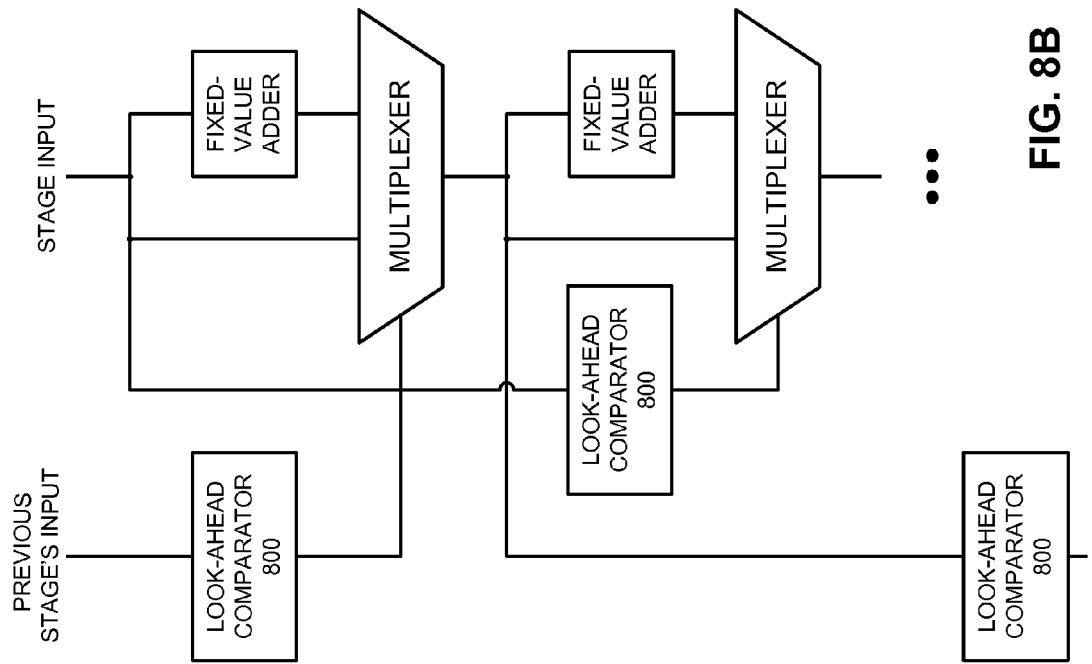
FIG. 8B illustrates a conditional adder with look-ahead comparators in accordance with an embodiment.
Figure 8A:
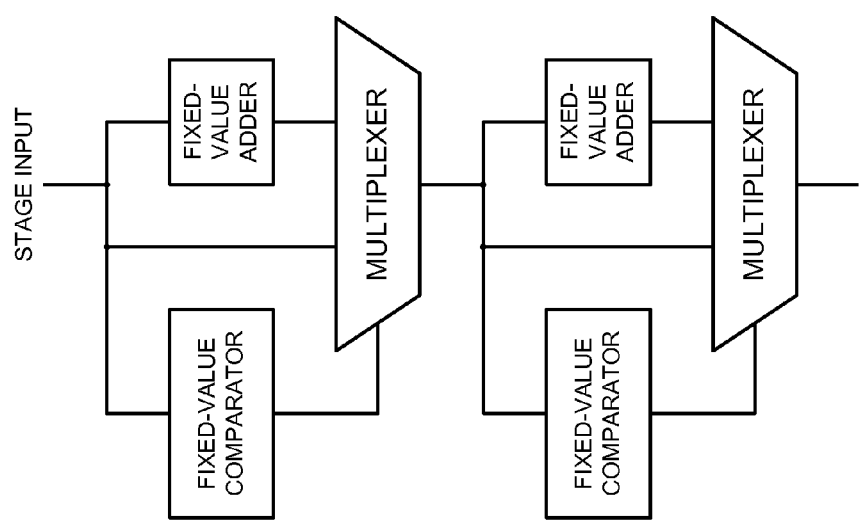
FIG. 8A illustrates a conditional adder in accordance with an embodiment.

A conditional adder can be implemented in hardware by placing a fixed-value comparator and a fixed-value adder in parallel (as illustrated in FIG. 8A). The conditional adder's input and the output of the fixed-value adder serve as inputs to a multiplexer, with the output of the comparator controlling the selection of the multiplexer. However, in some implementations, the comparators can become the critical path for the conversion operation.

In some embodiments, configuring comparators to inspect the inputs of a preceding row facilitates removing the comparators from the critical path of a conditional adder. For instance, if the input to a first stage is between zero and 24 inclusively, then the following (second) stage is guaranteed to not perform the addition operation, because doubling the input will cause the second stage's value to be at most 48. If the first stage's input is between 25 and 49 inclusively, then the first stage won't trigger the adder, but the second stage will need to. Using this logic, a look-ahead comparator should select the adder's output when the previous stage's input is between 25 and 49 inclusively or between 75 and 99 inclusively. Note that, while such modules may substantially increase the area of the design, they can improve performance by ensuring that the comparator is off the critical path. Such look-ahead comparators can be used in any conditional adder modules except for the first on a diagonal path (e.g., the first conditional adder in a BCC units column, which is the first stage to begin operating on an input).

FIG. 8B illustrates the use of look-ahead comparators in a conditional adder. Look-ahead comparators 800 are modified look-ahead double comparators that analyze the previous stage's input to determine whether the input value falls between 25 and 49 inclusively or between 75 and 99 inclusively. Note that FIGS. 8A-8B do not include neighboring columns and their associated shifts in/out.

Figure 9:
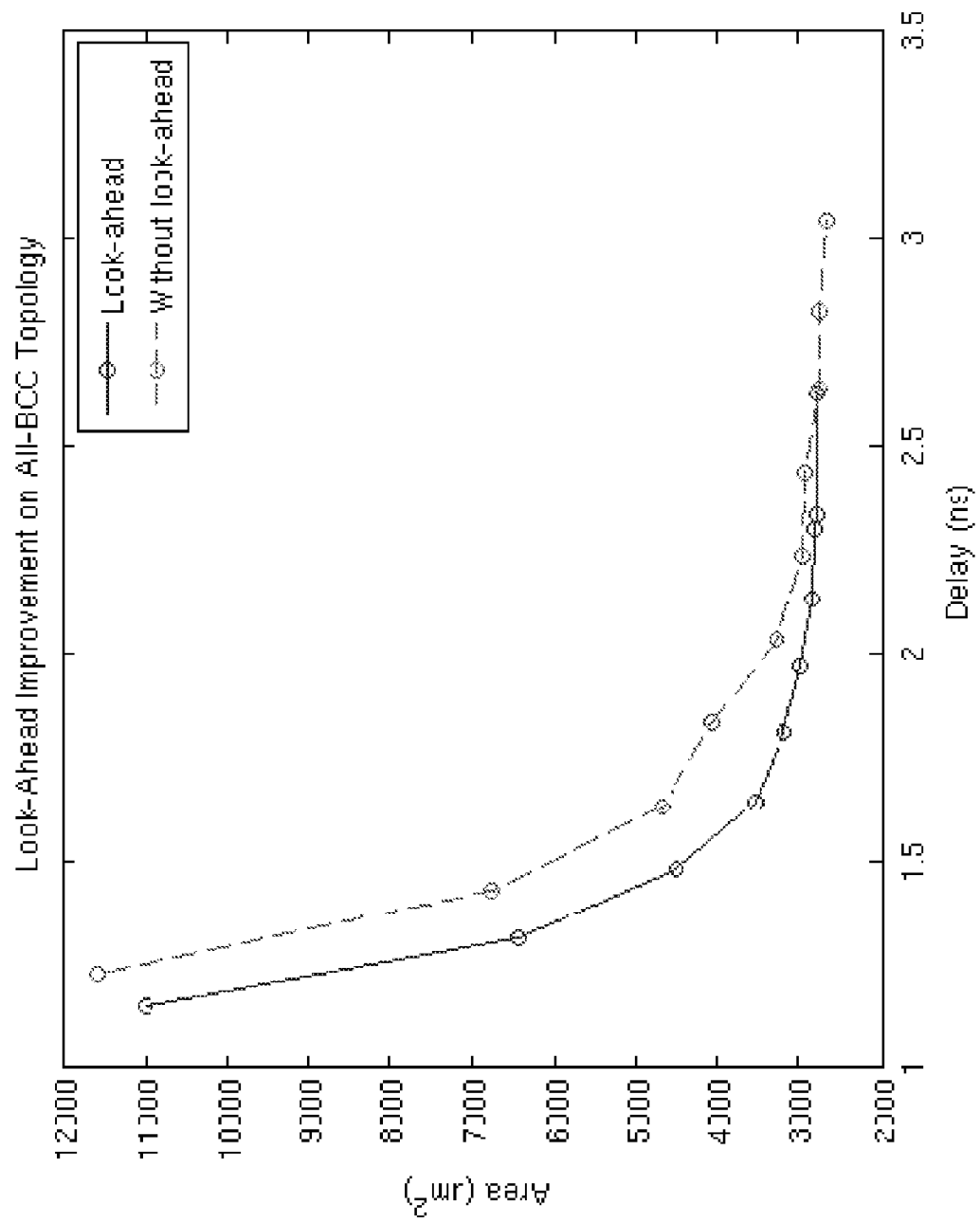
FIG. 9 illustrates the simulated improvement of adding look-ahead comparators to an all-BCC converter in accordance with an embodiment.

FIG. 9 illustrates the simulated improvement of adding look-ahead comparators to an all-BCC converter. Using look-ahead comparators improves all of the design points except those with the absolute lowest area.

Note that look-ahead comparators can also be designed for BCD-to-BCC conversion implementations. However, such comparators may be slightly less efficient in some implementations, because one may not always be able to predict the behavior of the next row given the inputs to the current row. For instance, a base-10 look-ahead comparator also needs to consider the bit that will be shifted in from the column to the right. The fundamental reason that this works for all-BCC but not BCD-to-BCC is that 50 is divisible by 2, which creates comparator break-points at 25 and 75, but 5 is not divisible by 2, so a tie-breaker bit is needed.

In some situations, such horizontal dependencies might hamper any potential look-ahead benefits. However, the bit being shifted in from the right also comes early when look-ahead comparators are used. As illustrated in the truth table of FIG. 2B, whenever the conditional add is triggered, the output S3 goes high; conversely, whenever the conditional add is not triggered, S3 goes low. Therefore, the shifted bit (S3) is determined entirely by the previous stage's look-ahead comparator. Wiring the converter circuitry to take advantage of this information can reduce the horizontal dependency to a point where some look-ahead-based performance benefits are possible.

Figure 10:
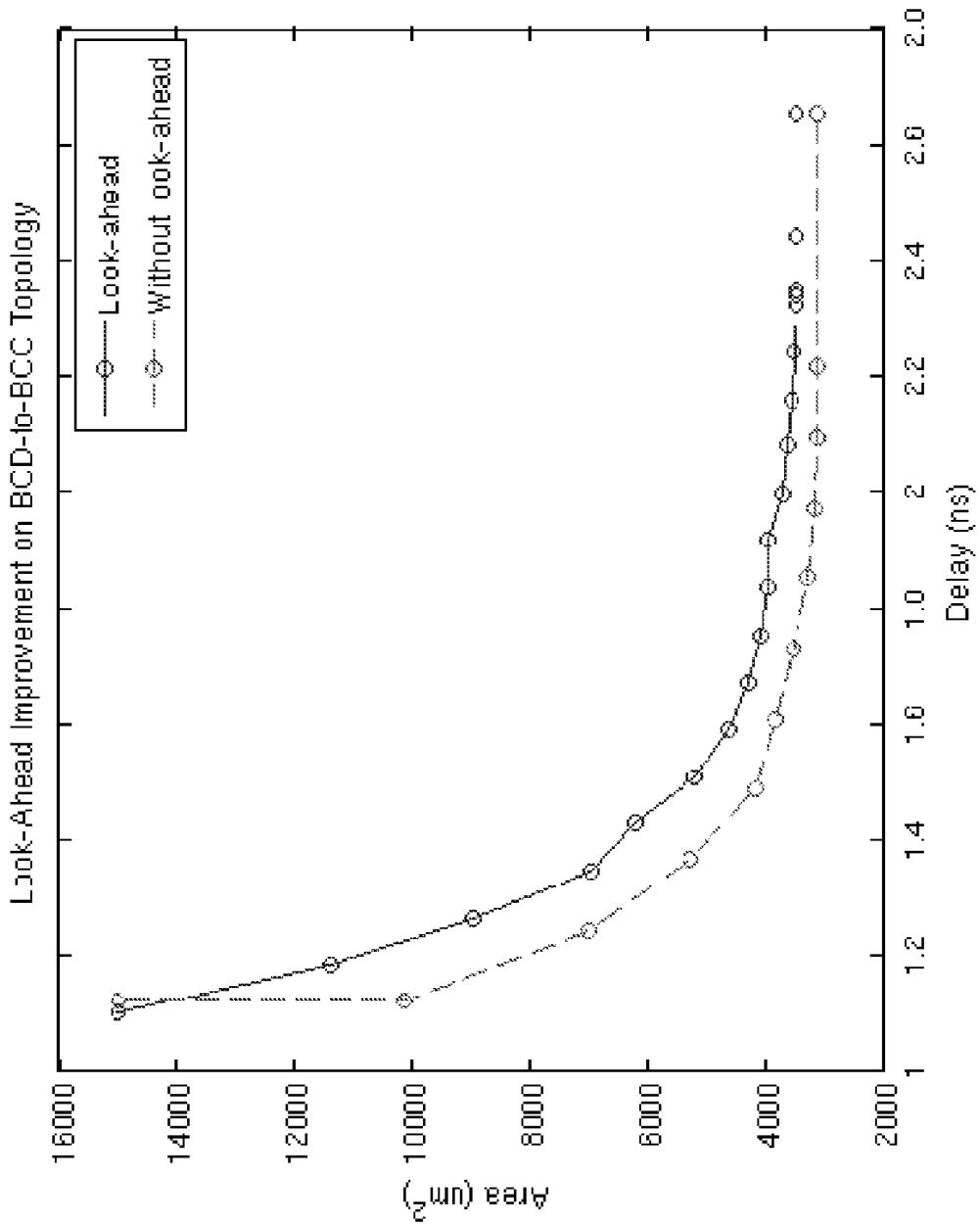
FIG. 10 illustrates the simulated improvement of adding look-ahead comparators to a BCD-to-BCC-based converter in accordance with an embodiment.

FIG. 10 illustrates the simulated improvement of adding look-ahead comparators to a BCD-to-BCC converter. In some absolute-minimum-delay designs, adding look-ahead capabilities to the BCD-to-BCC converter can improve the performance of the conversion operation.

Note that, in some embodiments, similar look-ahead capabilities can also be used to design a look-ahead adder instead of (or in addition to) a look-ahead comparator. While such modifications may also be complicated by horizontal dependencies in the converter array, they may in some instances also provide performance benefits.

Optimizing the Area and Delay of Converter Implementations

One factor to consider when synthesizing a converter implementation using electronic design automation (EDA) tools (e.g., the Synopsys® Design Compiler®) is whether "don't care" values (e.g., the "XXXX" values in FIG. 2B) are optimized properly. Regardless of the topology chosen, properly signifying this information to the EDA tools can result in an improvement in area-delay product of 20-50%. For instance, some EDA tools may not get any benefit when such information is encoded in certain constructs (e.g., if-else statements in the Verilog hardware description language). For example, in some EDA tools the code segment illustrated in TABLE 1 might not be optimized properly, and thus might actually hurt performance relative to a single conditional adder that covers all input cases. In some cases, an equivalent alternative construct (such as the Verilog case statement illustrated in TABLE 2) may provide the same output values but result in the previously mentioned 20-50% area-delay product gain.

TABLE 1

```
module addifgt4 (a, y);
    input [3:0] a;
    output reg [3:0] y;
    always @ (*) begin
        if (a<5) y=a;
        else if (a>4 & a<10) y=a+3;
        else y=4'bxxxx;
    end
endmodule
```

Figure 11:
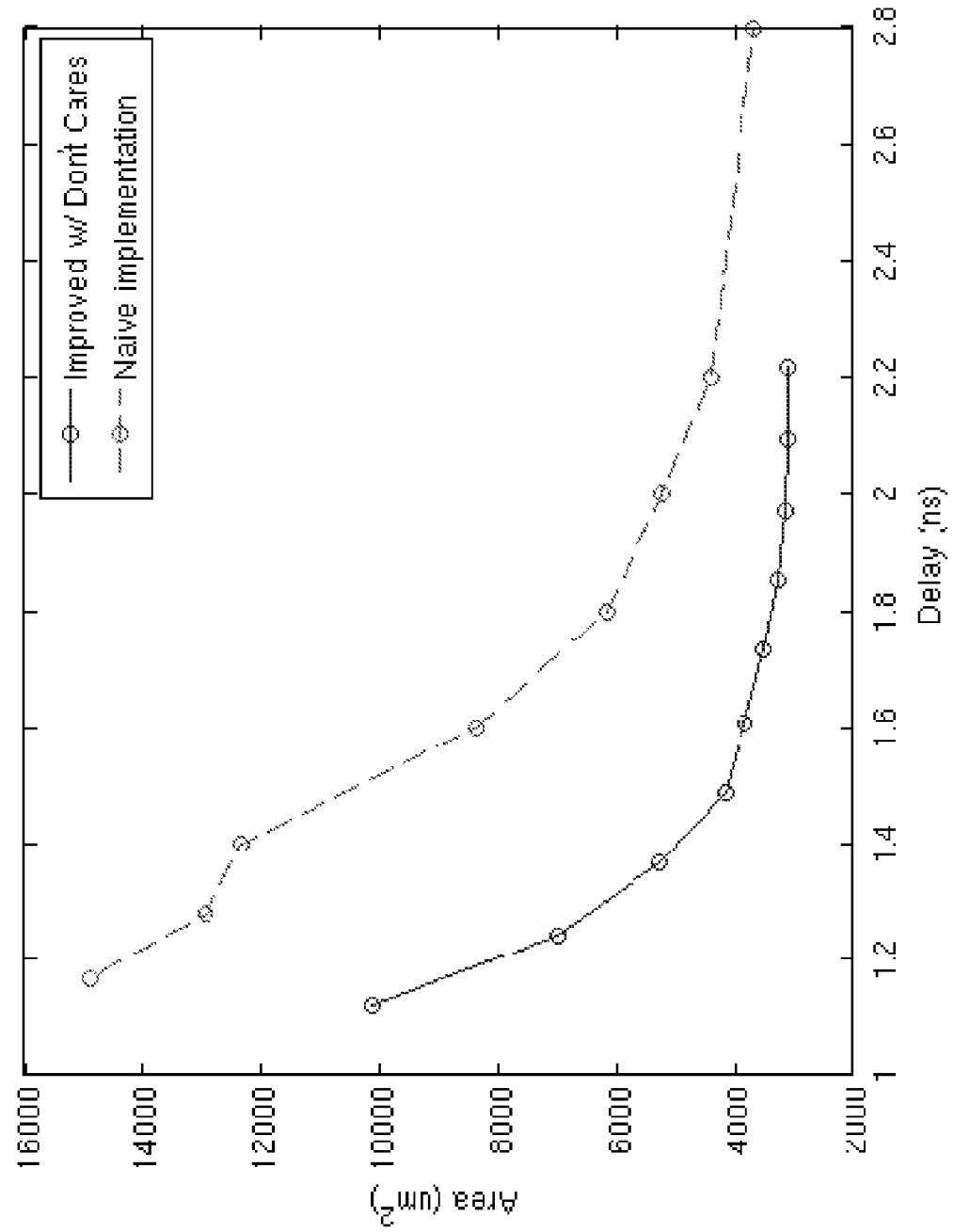
FIG. 11 illustrates the potential improvement benefits of successful don't-care optimization for a BCD-to-BCC-based converter in accordance with an embodiment.

FIG. 11 illustrates the potential improvement benefits of successful don't-care optimization for the BCD-to-BCC converter discussed in the previous section. These results emphasize the importance of explicitly describing which inputs are invalid to minimize a truth table's complexity and improve the performance of the synthesized design output.

TABLE 2

```
module addifgt4 (a, y);
    input [3:0] a;
    output reg [3:0] y;
    always @ (*) begin
        case(a)
            0: y=4'd0;
            1: y=4'd1;
            2: y=4'd2;
            3: y=4'd3;
            4: y=4'd4;
            5: y=4'd8;
            6: y=4'd9;
            7: y=4'd10;
            8: y=4'd11;
            9: y=4'd12;
            default: y=4'bxxxx;
        endcase
    end
endmodule
```

Design Trade-Offs

Figure 12A:
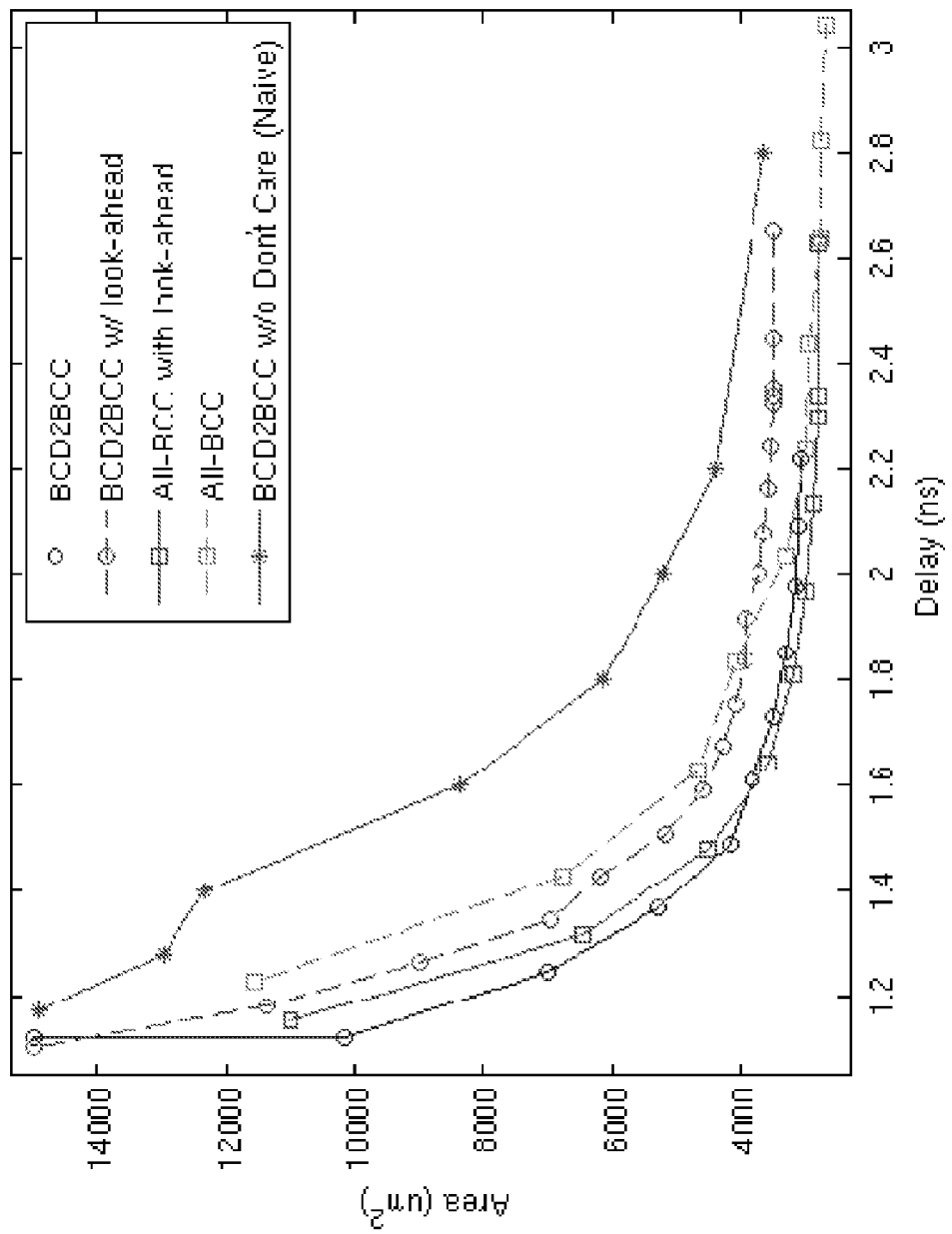
FIG. 12A illustrates the simulated performance characteristics of the disclosed BCC conversion techniques for 32-bit conversions in accordance with an embodiment.
Figure 12B:
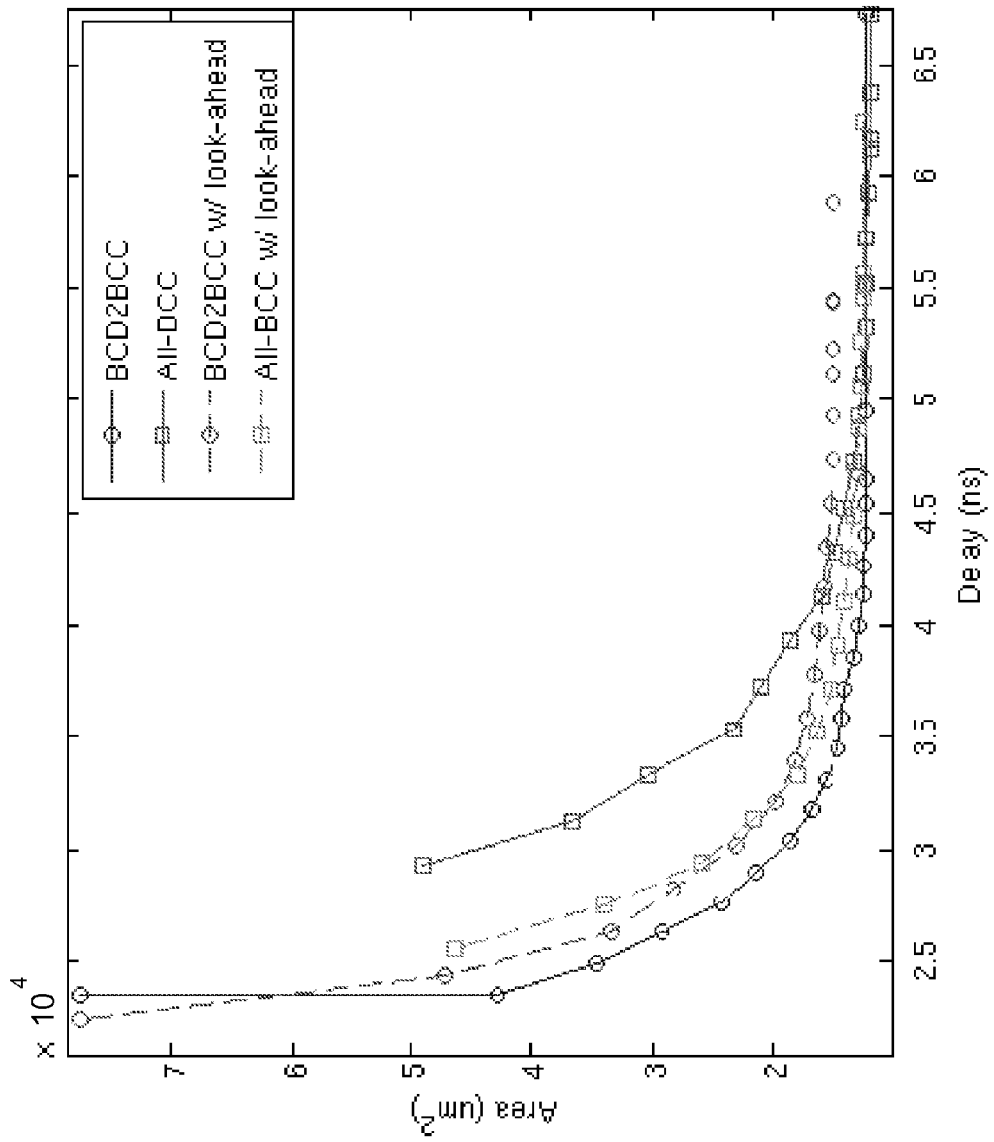
FIG. 12B illustrates the simulated performance characteristics of the disclosed BCC conversion techniques for 64-bit conversions in accordance with an embodiment.

FIGS. 12A and 12B illustrate the simulated performance characteristics of the disclosed BCC conversion techniques (for 32-bit and 64-bit simulations, respectively). Unless specified otherwise, all of the designs illustrated in FIGS. 12A-12B do not use look-ahead comparators, and have been optimized using don't-care values.

The simulation results in FIG. 12A (for a 32-bit conversion) show that, in general, BCD-to-BCC without look-ahead benefits low-latency designs and all-BCC with look-ahead benefits low-area designs. All-BCC without look-ahead is a potential option when delay is not a design concern, and BCD-to-BCC with look-ahead is a potential option when area and energy are not a design concern.

FIG. 12B illustrates substantially similar results for 64-bit conversions; the main difference is that BCD-to-BCC has an even greater latency advantage over all-BCC than in 32-bit converters. This is likely because the main binary-to-BCD converter area grows with the number of bits squared, while the final BCD-to-BCC converter grows linearly. Because BCD-to-BCC benefits from a simpler, lower-area main conversion section (at the cost of the final converter), BCD-to-BCC may be preferable for large converters, while all-BCC designs may be preferable for smaller converters. Note that while the results illustrated in FIGS. 12A-12B discuss the conversion of 32- and 64-bit binary values, the disclosed techniques are in no way limited to these bit widths, and can scale to both larger and smaller binary values.

In summary, embodiments of the present invention facilitate converting binary values into the BCC format. One technique facilitates the direct conversion of binary numbers into BCC. A second variation first converts a binary number into an intermediate BCD value, and then converts that BCD value into a BCC value. Look-ahead comparators can further improve conversion performance by decreasing the latency of the conversion operation. By speeding up the conversion of binary values to decimal-format values, the disclosed techniques facilitate leveraging dedicated binary-format hardware for decimal-format operations, thus improving the performance of decimal-format operations.

Computing Environment

Figure 13:
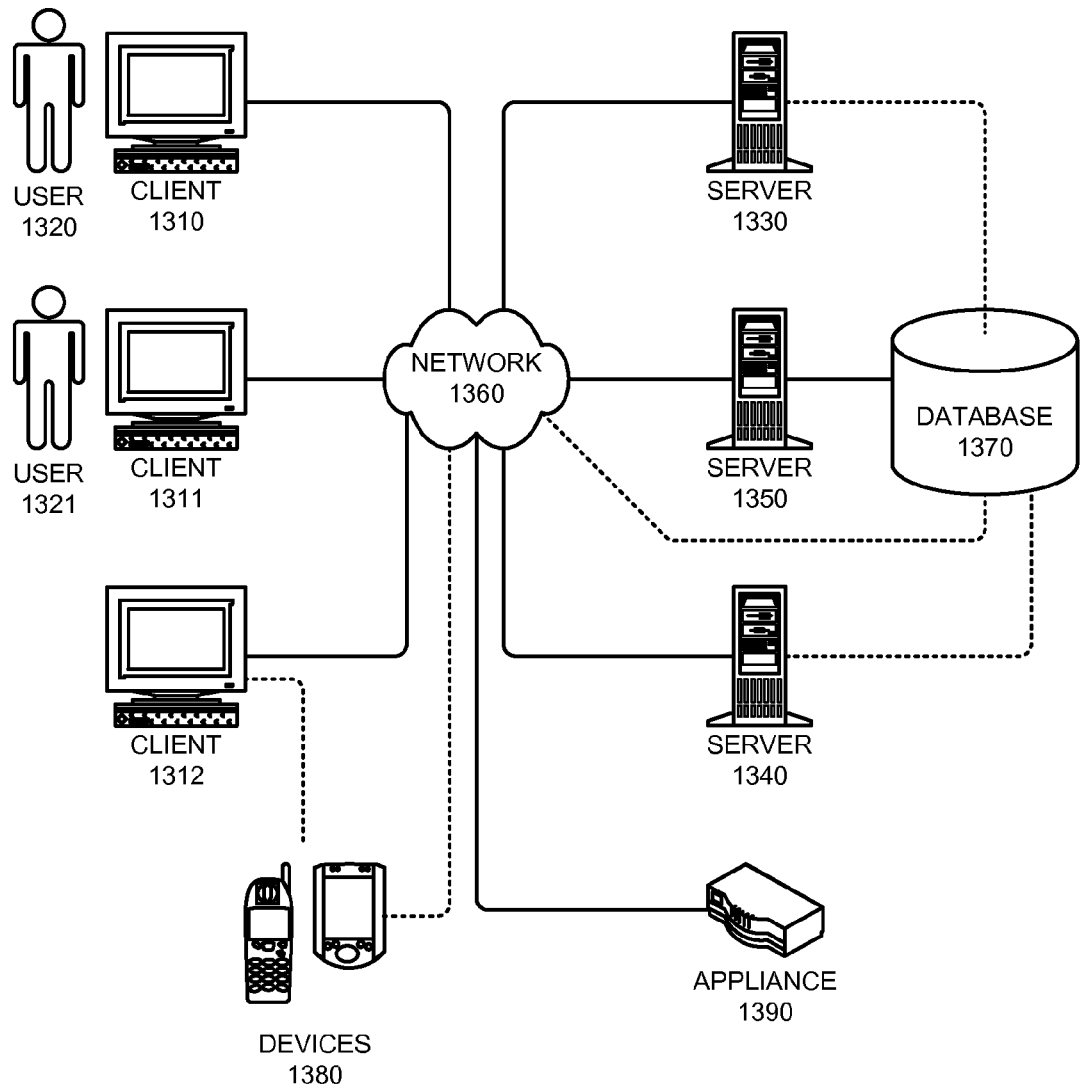
FIG. 13 illustrates a computing environment in accordance with an embodiment.

In some embodiments of the present invention, techniques for converting binary values into the BCC format can be incorporated into a wide range of computing devices in a computing environment. For example, FIG. 13 illustrates a computing environment 1300 in accordance with an embodiment of the present invention. Computing environment 1300 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 13, computing environment 1300 includes clients 1310-1312, users 1320 and 1321, servers 1330-1350, network 1360, database 1370, devices 1380, and appliance 1390.

Clients 1310-1312 can include any node on a network that includes computational capability and includes a mechanism for communicating across the network. Additionally, clients 1310-1312 may comprise a tier in an n-tier application architecture, wherein clients 1310-1312 perform as servers (servicing requests from lower tiers or users), and wherein clients 1310-1312 perform as clients (forwarding the requests to a higher tier).

Similarly, servers 1330-1350 can generally include any node on a network including a mechanism for servicing requests from a client for computational and/or data storage resources. Servers 1330-1350 can participate in an advanced computing cluster, or can act as stand-alone servers. For instance, computing environment 1300 can include a large number of compute nodes that are organized into a computing cluster and/or server farm. In one embodiment of the present invention, server 1340 is an online "hot spare" of server 1350.

Users 1320 and 1321 can include: an individual; a group of individuals; an organization; a group of organizations; a computing system; a group of computing systems; or any other entity that can interact with computing environment 1300.

Network 1360 can include any type of wired or wireless communication channel capable of coupling together computing nodes. This includes, but is not limited to, a local area network, a wide area network, or a combination of networks. In one embodiment of the present invention, network 1360 includes the Internet. In some embodiments of the present invention, network 1360 includes phone and cellular phone networks.

Database 1370 can include any type of system for storing data in non-volatile storage. This includes, but is not limited to, systems based upon magnetic, optical, or magneto-optical storage devices, as well as storage devices based on flash memory and/or battery-backed up memory. Note that database 1370 can be coupled: to a server (such as server 1350), to a client, or directly to a network. In some embodiments of the present invention, database 1370 is used to store information related to cache hit and miss likelihoods. Alternatively, other entities in computing environment 1300 may also store such data (e.g., servers 1330-1350).

Devices 1380 can include any type of electronic device that can be coupled to a client, such as client 1312. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 1380 can be coupled directly to network 1360 and can function in the same manner as clients 1310-1312.

Appliance 1390 can include any type of appliance that can be coupled to network 1360. This includes, but is not limited to, routers, switches, load balancers, network accelerators, and specialty processors. Appliance 1390 may act as a gateway, a proxy, or a translator between server 1340 and network 1360.

Note that different embodiments of the present invention may use different system configurations, and are not limited to the system configuration illustrated in computing environment 1300. In general, any device that stores and/or converts values using decimal formats may incorporate elements of the present invention.

Figure 14:
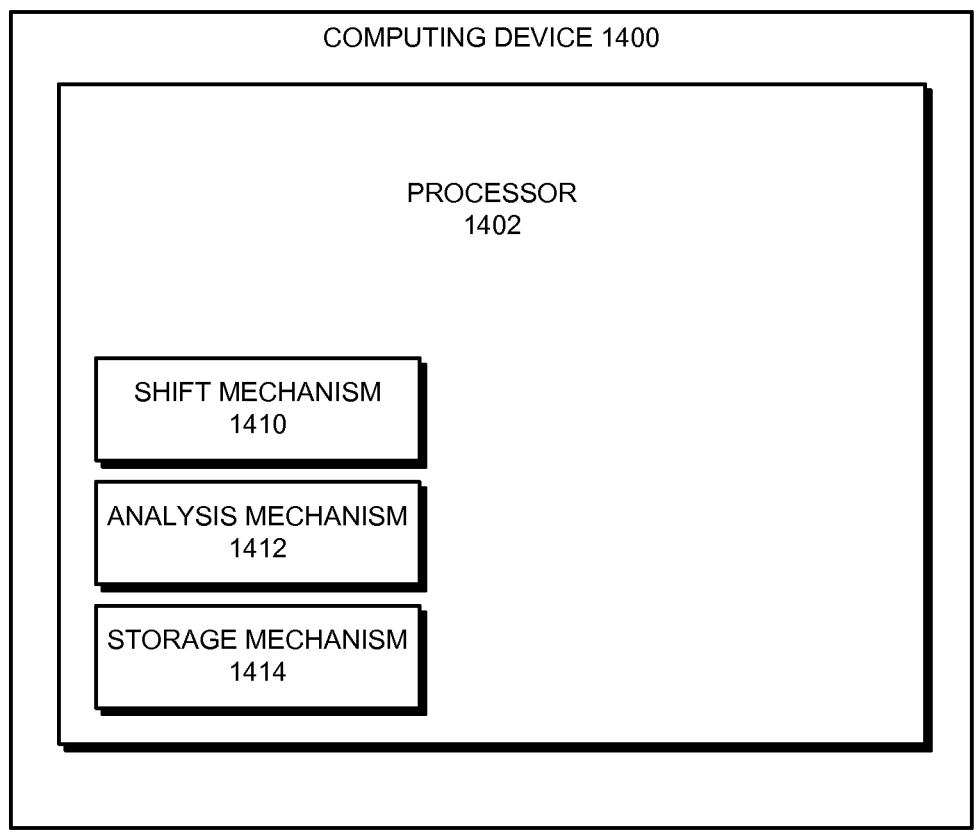
FIG. 14 illustrates a computing device in accordance with an embodiment.

FIG. 14 illustrates a computing device 1400 that includes a processor 1402. Processor 1402 includes a shift mechanism 1410, an analysis mechanism 1412, and a storage mechanism 1414. Computing device 1400 uses shift mechanism 1410, analysis mechanism 1412, and storage mechanism 1414 to convert binary values into BCC values.

During operation, computing device 1400 uses shift mechanism 1410 to iteratively shift bits of a binary value into an intermediate value. After every shift, analysis mechanism 1412 analyzes a portion of the intermediate value to determine whether the portion is larger than a specified first value. If so, it adds a second value to that portion. After all of the bits of the binary value have been shifted into the intermediate value, storage mechanism 1414 is configured to store the resulting BCC value that corresponds with the original binary value.

In some embodiments of the present invention, some or all aspects of shift mechanism 1410, analysis mechanism 1412, and/or storage mechanism 1414 can be implemented as dedicated hardware modules in computing device 1400. These hardware modules can include, but are not limited to, processor chips, application-specific integrated circuit (ASIC) chips, field-programmable gate arrays (FPGAs), memory chips, and other programmable-logic devices now known or later developed.

Processor 1402 can include one or more specialized circuits for performing the operations of the mechanisms. Alternatively, some or all of the operations of shift mechanism 1410, analysis mechanism 1412, and/or storage mechanism 1414 may be performed using general-purpose circuits in processor 1402 that are configured using processor instructions. Also, while FIG. 14 illustrates shift mechanism 1410, analysis mechanism 1412, and/or storage mechanism 1414 as being internal to processor 1402, in alternative embodiments some or all of these mechanisms can be external to processor 1402.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for converting a binary value to a binary-coded-centimal value, the method comprising:
   iteratively shifting bits of the binary value into an intermediate value;
   analyzing a portion of the intermediate value after each shift to determine whether the portion is greater than a first value, and if so, adding a second value to the portion; and
   after all of the bits of the binary value have been shifted into the intermediate value, using the intermediate value as the binary-coded-centimal value for the binary value, wherein the binary-coded-centimal value encodes two decimal digits that can range in value from zero to 99 in eight bits of data;
   wherein iteratively shifting bits of the binary value comprises using a combinational circuit comprised of one or more eight-bit conditional adders;
   wherein an eight-bit conditional adder comprises:
      a comparator that determines whether an eight-bit binary value entering the eight-bit conditional adder is greater than 49;
      an adder that adds 78 to the eight-bit binary value; and
      a multiplexer that outputs either the eight-bit binary value or the output of the adder based on the output of the comparator.

2. The computer-implemented method of claim 1,
   wherein the portion is eight bits wide;
   wherein the first value is 49; and
   wherein the second value is 78.

3. The computer-implemented method of claim 2, wherein the method further comprises analyzing multiple eight-bit portions of the intermediate value after each shift and adding 78 to each eight-bit portion whose value is greater than 49.

4. The computer-implemented method of claim 3, wherein iteratively shifting bits of the binary value comprises using a shift register to iteratively shift the bits of the binary value into the intermediate value.

5. The computer-implemented method of claim 3, wherein the combinational circuit comprises pipeline registers that facilitate pipelining the binary-to-binary-coded-centimal conversion operation.

6. The computer-implemented method of claim 1, wherein one or more eight-bit conditional adders include look-ahead capabilities that facilitate reducing the latency of converting the binary value to the binary-coded-centimal value.

7. The computer-implemented method of claim 6, wherein an eight-bit conditional adder that supports look-ahead capabilities comprises:
   an input from a comparator in an earlier stage that indicates whether an eight-bit binary value entering the eight-bit conditional adder will be greater than 49;
   an adder that adds 78 to the eight-bit binary value; and
   a multiplexer that outputs either the eight-bit binary value or the output of the adder based on the input;
   wherein using the input from the comparator in the earlier stage facilitates removing the comparison latency from the critical path of the eight-bit conditional adder.

8. The computer-implemented method of claim 1, wherein the method further comprises:
   converting an initial binary-coded-centimal value to an initial binary value;
   performing binary computations using the initial binary value to derive a modified binary value; and
   converting the modified binary value to the binary-coded-centimal value.

9. A computer-implemented method for converting a binary value to a binary-coded-centimal value, the method comprising:
   iteratively shifting bits of the binary value into an intermediate value;
   analyzing a four-bit portion of the intermediate value after each shift to determine whether the four-bit portion is greater than four, and if so, adding three to the four-bit portion, wherein after all of the bits of the binary value have been shifted into the intermediate value, the intermediate value stores a binary-coded-decimal value for the binary value that encodes each decimal digit in four bits; and
   converting the binary-coded-decimal value into the binary-coded-centimal value, wherein binary-coded-centimal values encode two decimal digits that range in value from zero to 99 in eight bits of data;
   wherein converting the binary-coded-decimal value into the binary-coded-centimal value comprises:
      using a first four-bit portion of the intermediate value as a high-order decimal digit;
      using a second four-bit portion of the intermediate value as a low-order decimal digit; and
      multiplying the first four-bit portion by ten and then adding the result to the second four-bit portion to form an eight-bit binary-coded-centimal value.

10. The computer-implemented method of claim 9, wherein the method further comprises analyzing multiple four-bit portions of the intermediate value after each shift and adding three to each four-bit portion whose value is greater than four.

11. The method of claim 10, wherein iteratively shifting bits of the binary value further comprises using a combinational circuit comprised of multiple four-bit conditional adders.

12. The method of claim 11, wherein a four-bit conditional adder comprises:
   a comparator that determines whether a four-bit binary value entering the four-bit conditional adder is greater than four;
   an adder that adds three to the four-bit binary value; and
   a multiplexer that outputs either the four-bit binary value or the output of the adder based on the output of the comparator.

13. The computer-implemented method of claim 11, wherein one or more four-bit conditional adders include look-ahead capabilities that facilitate reducing the latency of converting the binary value to the binary-coded-centimal value.

14. The computer-implemented method of claim 13, wherein a four-bit conditional adder that supports look-ahead capabilities comprises:
   an input from a comparator in an earlier stage that indicates whether a four-bit binary value entering the four-bit conditional adder will be greater than four;
   an adder that adds three to the four-bit binary value; and
   a multiplexer that outputs either the four-bit binary value or the output of the adder based on the input;
   wherein using the input from the comparator in the earlier stage facilitates removing the comparison latency from the critical path of the four-bit conditional adder.

15. A processor that converts a binary value to a binary-coded-centimal value, comprising:
   a combinational circuit comprised of one or more eight-bit conditional adders;
   a shift mechanism configured to use the combinational circuit to iteratively shift bits of the binary value into an intermediate value;
   an analysis mechanism configured to analyze a portion of the intermediate value after each shift to determine whether the portion is greater than a first value, and if so, adding a second value to the portion; and
   a storage mechanism, wherein after all of the bits of the binary value have been shifted into the intermediate value, the storage mechanism is configured to store the binary-coded-centimal value for the binary value;
   wherein the binary-coded-centimal value encodes two decimal digits that can range in value from zero to 99 in eight bits of data; and
   wherein an eight-bit conditional adder comprises:
      a comparator that determines whether an eight-bit binary value entering the eight-bit conditional adder is greater than 49;
      an adder that adds 78 to the eight-bit binary value; and
      a multiplexer that outputs either the eight-bit binary value or the output of the adder based on the output of the comparator.

16. The processor of claim 15,
   wherein the portion is eight bits wide;
   wherein the first value is 49; and
   wherein the second value is 78.

17. The processor of claim 15,
   wherein the portion is four bits wide;
   wherein the first value is four;
   wherein the second value is three;
   wherein the intermediate value comprises a binary-coded-decimal value that encodes each decimal digit in four bits; and
   wherein the analysis mechanism is further configured to convert the binary-coded-decimal value into the binary-coded-centimal value.

18. The processor of claim 15,
   wherein the shift mechanism comprises a combinational circuit comprised of multiple conditional adders; and
   wherein one or more of the conditional adders include look-ahead capabilities that facilitate reducing the latency of converting the binary value to the binary-coded-centimal value.

* * * * *

UNITED STATES PATENT AND TRADEMARK OFFICE
CERTIFICATE OF CORRECTION

PATENT NO. : 8,977,663 B2  
APPLICATION NO. : 13/419328  
DATED : March 10, 2015  
INVENTOR(S) : Lee et al.

Page 1 of 1

It is certified that error appears in the above-identified patent and that said Letters Patent is hereby corrected as shown below:

In the specification,

In column 5, line 37, delete ""b2 on)" and insert -- "b2on") --, therefor.

In column 5, line 40, delete "b2 on" and insert -- b2on --, therefor.

Signed and Sealed this
Twentieth Day of October, 2015

Michelle K. Lee
*Director of the United States Patent and Trademark Office*